United States Patent [19]

Clark

[11] Patent Number: 4,929,381

[45] Date of Patent: * May 29, 1990

[54] INORGANIC ANION EXCHANGERS AND PREPARATION THEREOF

[75] Inventor: Howard W. Clark, Midland, Mich.

[73] Assignee: The Dow Chemical Company, Midland, Mich.

[*] Notice: The portion of the term of this patent subsequent to Sep. 6, 2005 has been disclaimed.

[21] Appl. No.: 162,714

[22] Filed: Mar. 1, 1988

Related U.S. Application Data

[63] Continuation-in-part of Ser. No. 876,603, Jun. 20, 1986, abandoned, which is a continuation-in-part of Ser. No. 748,274, Jun. 24, 1985, abandoned.

[51] Int. Cl.$^5$ .............................................. C11D 3/14
[52] U.S. Cl. ............................ 252/174.25; 106/443; 106/442; 210/683; 252/175; 252/179; 252/184; 423/463; 423/467; 423/593; 423/600
[58] Field of Search ........................ 106/288; 210/683; 252/174, 25, 175, 179, 184; 423/463, 467, 593, 600

[56] References Cited

U.S. PATENT DOCUMENTS

| | | | |
|---|---|---|---|
| 2,213,641 | 9/1940 | Tainton | 252/89 |
| 2,561,695 | 7/1951 | Gustafson | 127/46 |
| 3,002,932 | 10/1961 | Duwell et al. | 252/179 |
| 3,907,715 | 9/1975 | Arai et al. | 252/465 |
| 4,065,257 | 12/1977 | Coe et al. | 8/74 |
| 4,121,903 | 10/1978 | Smolka | 8/137 |
| 4,216,084 | 8/1980 | Ikari et al. | 210/32 |
| 4,277,346 | 7/1981 | Sakotani et al. | 210/691 |
| 4,299,739 | 11/1981 | Esposito et al. | 252/545 |
| 4,326,978 | 4/1982 | Moesch | 252/107 |
| 4,380,453 | 4/1983 | Claiborne | 8/606 |
| 4,392,961 | 7/1983 | Lee et al. | 210/679 |
| 4,661,282 | 4/1987 | Clark | 106/288 B |

FOREIGN PATENT DOCUMENTS

| | | |
|---|---|---|
| 44003 | 1/1982 | European Pat. Off. . |
| 2309099 | 8/1973 | Fed. Rep. of Germany . |
| 2726192 | 12/1978 | Fed. Rep. of Germany . |
| 2814329 | 10/1979 | Fed. Rep. of Germany . |
| 132794 | 11/1978 | German Democratic Rep. . |
| 48-8394 | 3/1973 | Japan . |
| 48-29477 | 9/1973 | Japan . |
| 48-3760 | 1/1974 | Japan . |
| 51-20997 | 6/1976 | Japan . |
| 51-29129 | 8/1976 | Japan . |
| 53-19555 | 6/1978 | Japan . |
| 517567 | 6/1976 | U.S.S.R. . |
| 1544430 | 4/1979 | United Kingdom . |

OTHER PUBLICATIONS

Ullmanns Encyklopadie der technischen Chemie, Edition 4, vol. 13 (Weinheim and New York: Verlag Chemie, (1977), pp. 293–294, "Hormone bis Keramik".
Chemical Abstract 92:135932a, "Alumina as an Ion-Exchanger and its Application. Part III. ph and Adsorption of Anionic Dyes by Alumina".
Chemical Abstract 94:144763q, "Advanced Treatment of Dye Waste Water by Adsorption".
Chemical Abstract 92:112623m, "Application of Sodium Aluminum Silicates in Detergents. Part VIII. Dye Equilibriums in Multicomponent Systems".
Chemical Abstract 89:79636f, "Treatment of Dye-Containing Waste Water with Magnesium Compound Adsorbents".
Chemical Abstract 93:79029t, "The Adsorption of Cationic Dyes on Hydrated Zirconium Oxide".
Chemical Abstract 98:166426s, "Adsorption Treatment of the Wastewater from Dye Synthesis".
Chemical Abstract 89:91421q (re: Disclosure 1978, 171, 23).
Japanese Disclosure Koho, 1981-98265 (Matsushima et al.).
Japanese Disclosure Koho, 1973-69780 (Miyata et al.).
Japanese Disclosure Koho, 1972-42493 (Miyata et al.).
Japanese Disclosure Koho, 1973-69797 (Miyata et al.).
Duwell et al., "The Preparation and Properties of Some Synthetic Inorganic Anion Exchangers", *Journal of Physical Chemistry*, 63, 2044–2047.

*Primary Examiner*—Robert A. Wax
*Attorney, Agent, or Firm*—Joe R. Prieto; Barbara J. Sutherland

[57] ABSTRACT

A novel anion exchange material comprising substantially crystalline inorganic mixed metal hydroxides and mixed metal hydrated oxides exhibiting anion exchange properties at temperatures up to about 150° C. and a method of preparing the same is disclosed. The anion exchanger composition is prepared by coprecipitating hydroxides or hydrated oxides of metal elements such as aluminum and titanium and then drying the mixed metal hydroxides or hydrated oxides.

29 Claims, No Drawings

INORGANIC ANION EXCHANGERS AND PREPARATION THEREOF

CROSS-REFERENCE TO A RELATED APPLICATION

This is a Continuation-in-Part of application Ser. No. 876,603, filed Jun. 20, 1986, now abandoned, which is a Continuation-in-Part of application Ser. No. 748,274, filed Jun. 24, 1985, now abandoned.

BACKGROUND OF THE INVENTION

This invention concerns ion exchangers and, more particularly, this invention concerns inorganic anion exchangers, a process for their preparation, and their use. It is directed to a novel composition and a method for controlling colorant migration in a liquid by means of an anion exchanger material. More particularly, this invention relates to a composition and method for use in laundering clothes which controls and/or eliminates colorants in the water and allows differently colored clothes to be laundered together.

In the past, noncolorfast fabrics or substrates or items capable of producing colorants have been laundered with substrates or fabrics having different colors. This condition frequently resulted in colorants migrating from the noncolorfast item into the water and then onto differently colored fabrics or substrates resulting in undesirable coloring.

The use of anion exchange material for the removal of color from alkaline solution is described by Gustafson in U.S. Pat. No. 2,561,595. U.S. Pat. No. 3,002,932 describes several noncrystalline inorganic anion exchangers consisting essentially of hydrated oxides of pairs of elements selected from the group consisting of aluminum, silicon, titanium, zinc, and zirconium. These compositions are prepared by coprecipitating the hydrates of the combination of the oxides of the elements referred to above in an aqueous medium. The coprecipitation is carried out by gradually adding a base to an acid below a pH of 5 to bring the aqueous solution to a pH of about 5 to 7. The aqueous mixture is dried below about 150° C., followed by washing the dried mixed hydrated oxide with water, and again finally drying the mixture at below about 150° C.

In a paper by E. J. Duwell and J. W. Shepard, "The Preparation and Properties of Some Synthetic Inorganic Anion Exchangers", *Journal of Physical Chemistry*, Vol. 63, December, pp. 2044–47, (1959), various amorphous inorganic anion exchangers are described. The paper describes a method for preparing an amorphous $Zn(OH)_2$ exchanger and $Al(OH)_3$ exchanger. The amorphous exchangers are prepared by coprecipitating cations of higher valence with aluminum and zinc hydroxide in slightly acidic solutions to form a gel. The gels are then dried to form white, finely divided amorphous powders of $Al(OH)_3$ and $Zn(OH)_2$.

The prior art above reports that x-ray diffraction analysis of the exchangers described indicates that the exchangers are noncrystalline or amorphous. In addition, the prior art teaches that when the exchangers are dehydrated at 150° C. or higher, a crystalline product is formed and the product loses its anion exchange capacity.

Contrary to the teachings in the above prior art, the present invention provides novel inorganic mixed metal hydroxides and mixed metal hydrated oxides having a substantially crystalline structure, as shown by x-ray diffraction patterns, and exhibiting anion exchange properties. A method by which these inorganic mixed metal hydroxides and mixed metal hydrated oxides may be prepared is also shown.

One aspect of the present invention is an anion exchange material comprising a substantially crystalline material exhibiting anion exchange properties represented by the formula:

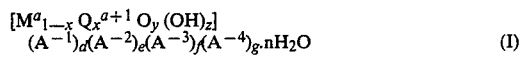

where M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$ are each one or more exchangeable anions each having a negative valence of 1, 2, 3, and 4, respectively; x is $0 < x < 0.5$; and n, y, z, d, e, f, and g are real numbers greater than or equal to zero and satisfy the following:

$$2y+z=a;\ y<z$$

$$0<d+2e+3f+4g\leq x$$

$$0\leq n\leq 10$$

provided that when y=0, a is not equal to 2.

Another aspect of the present invention is a process of preparing the compositions of the above formula (I) which comprise coprecipitating in an aqueous medium, at a constant acidic pH, inorganic mixed metal hydroxides or hydrated mixed metal oxides of metal elements, said mixed metal hydroxide or hydrated mixed metal oxides having a substantially crystalline lattice structure as shown by x-ray diffraction patterns and exhibiting anion exchange properties at temperatures up to 150° C.

A further aspect of this invention is a method of controlling colorant migration in a liquid comprising contacting said liquid with a sufficient amount of the above-described composition.

DETAILED DESCRIPTION OF THE PREFERRED EMBODIMENTS

The novel compositions of the present invention include complex inorganic salts of mixed metal hydroxides and partially hydrated mixed metal oxides having a crystalline lattice structure and exhibiting anion exchange properties. The compositions are essentially a combination of hydroxides and hydrated oxides of pairs of metal cations or elements. A first metal element of the pair of metal elements has a lower positive valence than that of a second metal element of the pair of metal elements. The first lower valent member has a positive valence lower by one integer than that of the second higher valent member of the pair. For example, if the first metal element has a valence of +2, the second mental element has a valence of +3, and if the first metal element has a valence of +3, then the second metal element has a valence of +4, and so on.

The first lower valent metal element of the composition of the present invention is present in a major molar amount and the second higher valent metal element is present in a minor molar amount. It is theorized that the minor constituent is substituted in the lattice structure of the major constituent. The combination of hydroxides and hydrated oxides of the pair of metal elements has a positive excess charge and this charge is balanced by an exchangeable anion or a mixture of two or more exchangeable anions.

The general formula describing the compositions of the present invention is shown by formula (I) above.

The composition for use in controlling colorant migration in a liquid comprises a detergent and an anion exchanger of formula (I).

With reference to the formula (I), a "hydroxide" is represented by the formula when $y=0$; an "oxide" is represented by the formula when $z=0$; and a "partially hydrated oxide" is represented by the formula when y and z are both positive real numbers. A preferred composition uses an anion exchanger material wherein x is from about 0.01 to about 0.4. A more preferred composition is when x is from about 0.1 to about 0.3. A most preferred composition is when x is about 0.1. A preferred composition uses an anion exchanger material wherein y/z is less than 1. Another preferred composition uses an anion exchanger material wherein y is 0 and z is 1.

As an example of the composition of formula (I), the metal element or elements M each may have a valence of $+2$ and the metal element or elements Q each may have a valence of $+3$. The combination may include a divalent metal element M, such as magnesium, calcium, strontium, barium, iron, cobalt, manganese, nickel, copper, zinc and mixtures thereof and a trivalent metal element Q, such as aluminum, iron, chromium, gallium, cobalt, rhenium, indium and mixtures thereof.

Another example of a combination of metal elements of formula (I) is the metal element or elements M each having a valence of $+3$ such as aluminum, iron, chromium, gallium, cobalt, rhenium, indium and mixtures thereof, and the metal element or elements Q each having a $+4$ valence. Metal element Q with a valence of $+4$ may be selected from elements such as titanium, germanium, tin, lead, zirconium, hafnium, vanadium and mixtures thereof. Still another example of a combination of metal elements according to the present invention is the metal element or elements M each having a $+4$ valence such as those described above and the metal element or elements Q each having a $+5$ valence. Metal element Q with a $+5$ valence may be selected from elements such as antimony, vanadium, niobium, tantalum and mixtures thereof. Yet another example of a combination of metal elements of formula (I) is the metal element or elements M each having a $+5$ valence such as those described above and the metal element or elements Q having a $+6$ valence. Metal element Q with a $+6$ valence may be selected from elements such as chromium, molybdenum, tungsten and mixtures thereof.

A preferred embodiment of the present invention is the pair of metal elements M and Q selected from the group consisting essentially of aluminum and titanium. Preferably, the mixed metal hydroxides and mixed metal hydrated oxides of aluminum and titanium are suitable for the anion exchanger material herein described. The more preferred composition of the present invention may be represented b the following general formula:

$$[Al_{1-x}Ti_xO_y(OH)_z] (A^{-1})_d(A^{-2})_e(A^{-3})_f(A^{-4})_g \cdot nH_2O \quad (II)$$

where $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, z, d, e, f, and g are real numbers greater than or equal to zero and satisfy the following:

$$2y+z=3; \quad y<z$$

$$0<d+2e+3f+4g<x$$

$$0<n<10$$

The "exchangeable anions" of the aforementioned compositions may be selected from any inorganic or organic exchangeable anions commonly known in the art of anion exchangers. These exchangeable anions may be selected from monovalent, bivalent, trivalent and tetravalent anions or mixtures of two or more of these exchangeable anions. In the above formulas, the anion $A^{-1}$, for example, may be an inorganic anion selected from halides such as fluorides ($F^{-1}$); chlorides ($Cl^{-1}$); bromides ($Br^{-1}$) and iodides ($I^{-1}$); sulfates such as $HSO_4^{-1}$; phosphates such as $H_2PO_4^{-1}$; permanganates ($MnO_4^{-1}$); nitrates ($NO_3^{-1}$); carbonates such as $HCO_3^{-1}$; hydroxides ($OH^{-1}$); and mixtures thereof. For example, the anion $A^{-1}$ may be a mixture of two or more of the exchangeable anions described above such as a mixture of $Cl^{-1}$ and $HCO_3^{-1}$. In the above formulas, the anion $A^{-2}$, for example, may be an inorganic anion selected from carbonates such as $CO_3^{-2}$; sulfates such as $SO_4^{-2}$; phosphates such as $HPO_4^{-1}$; and mixtures thereof. For example, the anion $A^{-2}$ may be a combination of two or more exchangeable anions described above such as a mixture of $SO_4^{-2}$ and $CO_3^{-2}$. In the above formulas, the anion $A^{-3}$, for example, may be a phosphate such as $PO_4^{-3}$. An example of the anion $A^{-4}$ used in the above formulas may include anions such as ethylenediaminetetraacetic acid (EDTA) and diphosphates such as

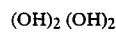

Other organic exchangeable anions used in the above formulas may include, for example, stearates, formates and benzoates or mixtures thereof.

In addition to the above anions used in the present invention, the composition of formula (I) may include a combination of two or more exchangeable anions selected from the group $A^{-1}$, $A^{-2}$, $A^{-3}$, and $A^{-4}$ as described above. For example, the compositions may include a mixture of exchangeable anions such as $Cl^{-1}$ and $CO_3^{-2}$ anions or $Cl^{-1}$ and $SO_4^{-2}$ anions. Preferably, the exchangeable anion used to form the mixed metal hydroxides and mixed metal hydrated oxides of the present invention is a chloride anion.

The total negative charge of the exchangeable anion or mixture of exchangeable anions selected for the above compositions should be sufficient to balance the excess positive charge of the combination of pairs of mixed metal oxides, hydroxides or hydrated oxides. The exchangeable anion used in the composition is present and bound, i.e., firmly incorporated, in the lattice structure of the composition. Generally, the exchangeable anion cannot be washed free of the composition and remains in the composition until the exchangeable anion is exchanged for or replaced by another anion.

A preferred composition of formula (I) uses an anion exchanger material wherein $A^{-1}$ is selected from the group consisting of $Cl^{-1}$, $Br^{-1}$, $F^{-1}$, $I^{-1}$, $H_2PO_4^{-1}$ and mixtures thereof and e, f, and g are zero. A more preferred composition uses an anion exchanger material wherein $A^{-1}$ is $Cl^{-1}$ and e, f, and g are zero. Another preferred composition uses an anion exchanger material wherein $A^{-2}$ is selected from the group consisting of $SO_4^{-2}$, $CO_3^{-2}$, $HPO_4^{-2}$ and mixtures thereof and d, f, and g are zero. Another more preferred composition uses an anion exchanger material wherein $A^{-2}$ is $SO_4^{-2}$ and d, f, and g are zero.

The compositions of formula (I) are characterized as having a crystalline lattice structure as shown, for example, by x-ray diffraction, electron diffraction, electron microscopy and micro area x-ray analysis. For example, a mixed metal hydroxide of aluminum and titanium has substantially the following peaks in the x-ray diffraction pattern as shown in Table I:

TABLE I

| d A° |
|---|
| 6.35 |
| 3.08 |
| 2.35 |
| 1.86 |
| 1.44 |

The compositions of formula (I) are also characterized as exhibiting anion exchange properties, i.e., anion exchange capacity, and thus are useful as anion exchangers. Generally, the anion exchangers are useful up to a temperature of about 150° C. Generally, the anion exchange capacities of the exchangers of formula (I) may range from about 0.5 milliequivalent per gram (meq/g) to about 2.0 meq/g and preferably from about 1.0 meq/g to about 1.5 meq/g. For example, the aluminum and titanium mixed metal hydroxide and mixed metal hydrated oxide may have an anion exchange capacity from about 1.0 to about 1.5 meq/g In its broadest scope, the anion exchangers of formula (I) are synthesized via controlled techniques of precipitation and drying. More particularly, the mixed metal hydroxides and mixed metal hydrated oxides are coprecipitated and then dried by evaporation. The precipitate may be filtered prior to evaporation and then washed with a solvent such as water after evaporation.

In carrying out the process of the present invention, salts or other derivatives of metal elements M and Q of the anion exchanger of formula (I) are dissolved in a solvent such as water. Preferably, the stoichiometric ratio of Q/M should be above zero to about 0.5. The total concentration of M and Q used in solution may be above about 0.1 molar and preferably above about 0.5 molar. The salts used are preferably acidic, and which on neutralization with a base, precipitate the hydroxides or hydrated oxides of metals M and Q. Water-soluble salts or water-insoluble salts may be used. The water-soluble salts used may include, for example, salts of chlorides ($Cl^{-1}$), sulfates ($SO_4^{-2}$), nitrates ($NO_3^{-1}$), carbonates ($CO_3^{-2}$) and mixtures thereof of the metals M and Q. Water-insoluble salts used may include hydroxides such as aluminum hydroxide and magnesium hydroxides. Preferably, the water-soluble salts of elements M and Q are used. Examples of water-soluble salts of aluminum usable herein may include aluminum chloride, aluminum oxalate, aluminum nitrate and aluminum sulfate. Preferably, aluminum chloride is used because it is readily available. Examples of water-soluble salts of titanium usable herein may include titanium tetrachloride and titanium sulfate. Preferably, titanium tetrachloride is used because it is readily available and relatively inexpensive.

The base used for neutralization and consequent coprecipitation of the hydroxide and hydrated oxides are, preferably, the alkali metal hydroxides such as sodium hydroxide or potassium hydroxide. Other useful bases include, for example, ammonium hydroxide or calcium hydroxide.

Coprecipitation of the mixed metal hydroxides and hydrated mixed metal oxides of formula (I) is carried out, preferably, by a continuous process. An aqueous solution containing the dissolved derivatives of metals M and Q is substantially simultaneously contacted with the base such that the coprecipitation reaction solution is maintained at a substantially constant pH. The pH for the reaction is kept substantially constant until the desired precipitation is obtained. The pH for the reaction may lie in the range of about 3 to about 7.5, and preferably in the range of about 4 to about 7. More preferably, a pH of 6 may be selected to carry out the precipitation and once the reaction begins, the pH of the reaction solution is, preferably, maintained at a pH of $6\pm1$. The precipitation may be carried out at a temperature of from about 50° C. to about 150° C., preferably from about 50° C. to about 150° C., and more preferably from about 70° C. to about 90° C.

A precipitate material of uniform particle size containing a substantial quantity of solvent such as water is formed when the hydroxides and hydrated oxides are precipitated. The major portion of the water used as the solvent may be readily separated or removed from the precipitate, for example, by filtration techniques known in the art. The precipitate of uniform particle size formed in the present process is an improvement over the bulky, gelatinous material formed during precipitation of hydrated oxides or hydroxides of prior art methods because the precipitate of uniform particle size is easier to filter and handle. In addition, after the uniform particle size precipitate is dried it forms a white, free-flowing, fine powdery product having a uniform size and shape.

After separating the precipitate material from the aqueous media, the material is then dried in air by heating at relatively low temperatures to remove the water in the material. Temperatures below about 150° C. are used to dry the material and preferably, a temperature of about 50° C. to below about 150° C. More preferably, the material may be dried at a temperature in the range of about 100° C. to below about 150° C. After drying or dehydrating the material, the resulting dried product is characterized as having a crystalline lattice structure as shown by x-ray diffraction patterns. The dried product is also characterized as having anion exchange capacities and may now be used an anion exchanger. The dried product, preferably, may be washed free of impurities which may be present in the material. For example, impurities such as sodium chloride and hydrochloric acid may be removed with water such as distilled or deionized water. Removal of such impurities is preferably carried out with water at a pH of from about 4 to about 7. The washed material is then suitable for use as an anion exchanger. The washed material may be filtered and used as an anion exchanger in a wet filter cake form or the washed material may be redried at the temperatures described above and used as an anion exchanger in a powder form.

Typically, the powder form of the anion exchanger produced by the process of the present invention may contain solids having a particle size of about 10 microns or less. Preferably, the powder may have solids with a particle size of about 5 microns or less. The powder particles may easily be broken up into individual particles having a size of from about 0.1 micron to about 0.4 micron or less by techniques known in the art such as grinding. The crystalline anion exchanger product produced by the present invention has a uniform and relatively larger particle size than the amorphous material of the prior art and, thus, the crystalline anion exchanger is relatively easier to handle and prepare in a desired form such as pellets.

The anion exchanger material produced by the present invention may be used as an exchanger alone, or in combination with other additives which are not detrimental to the anion exchange capacity of the anion exchanger. Other materials or phases which may be mixed with the exchangers may include, for example, fillers such as clays; binders such as cellulosic polymers, in particular, carboxymethylcellulose; and extenders such as $TiO_2$, $Al_2O_3$ and $Al(OH)_3$ which will not substantially adversely affect the anion exchange capacity of the exchanger. Other additives may be used, for example, to pelletize, agglomerate or coat the exchanger, provided the anion exchange capacity of the exchanger is not substantially reduced. The various additives used with the anion exchanger will depend on the application in which the exchanger is used.

The anion exchange material of formula (I) may be used in any application wherein an anion exchange mechanism is desired. Applications in which the exchanger is particularly useful include, for example, removing unwanted anions from aqueous systems such as removing chromates and dichromates from water waste streams or removing silicates and colloidal silica from industrial boiler systems.

Another application the anion exchanger of formula (I) finds use in is in laundry detergents as an additive for removing undesirable dye migration from one article of clothing to another. Still another application for using the anion exchanger involves removing sulfonated polystyrene from corn syrup by passing the syrup over an ion exchange column containing the anion exchanger of formula (I). Yet another application in which the anion exchanger may be used is in forming pigments by mixing the anion exchanger with a dye.

Another aspect of this invention is a method of controlling migration in a liquid comprising contacting said liquid with a sufficient amount of the above-described composition. Preferably, a sufficient amount of said composition is used such that substantially all of the colorant is removed from the liquid. A preferred method would be to admix the composition with the liquid. The composition may be used to control colorant in any liquid. A preferred method would be to use the composition in a substantially aqueous solution and more preferably in water.

The composition may be preferably used in water containing differently colored textile materials and even more preferably used in water containing undesirable colorant and textile materials of a color substantially different than the color of said undesirable colorant. Preferably, the composition may be used wherein the colorant is a dye.

The anion exchanger material may be combined with soap, detergent or preferably with a laundry soap formulation. Preferably, the soap or detergent composition is suitable for washing textile articles.

Further additives which are usually included in synthetic soap or detergent compositions are bleaching agents, dirt-suspending agents, builders, fillers, optical brightening agents, enzymes and mild perfumes.

Suitable bleaching agents which may be used include percarbonates or persulphates or, more usually alkali metal perborates. Suitable fillers include alkali metal sulphates, silicates and phosphates. A dirt-suspending agent which is often used in carboxymethyl-cellulose. Conventional optical brighteners are those of the triazinyl-diamino-stilbene disulphonic acid, pyrazoline, imidazolone, benzidine sulphone bisoxazole, distyryl diphenyl or dibenzimidazole types. Enzymes which are frequently used are those containing predominantly a protease produced from a spore-forming *Bacillus subtilis* bacteria. A suitable perfume is one having a citrus, cologne or pine base.

The present invention described broadly above is illustrated more specifically by the following examples. These examples are not intended to be, nor should they be construed as being limitative of the scope of the invention.

EXAMPLE 1

An acidic solution is made by diluting 25 liters of a 28 weight percent (wt. %) $AlCl_3$ solution to 60 liters total volume with water. In addition, a $TiCl_4$ solution is made by slowly adding 800 ml of $TiCl_4$ to 2000 ml of water to obtain a clear solution. The $TiCl_4$ solution is then added to the $AlCl_3$ solution to form an $AlCl_3$-$TiCl_4$ solution. A base solution is made by dissolving 9,000 g of NaOH in 60 liters of water. Then the following controlled precipitation method is carried out:

The $AlCl_3$-$TiCl_4$ solution and the base solution are fed simultaneously into a 10 liter glass reactor while stirring. The $AlCl_3$-$TiCl_4$ solution is introduced into the reactor at 100 ml/min and the base solution is introduced into the reactor at a feed rate sufficient to maintain the solution at a pH of about 6.0. The temperature of the reactor mixture is kept at 90° C. The reactor mixture is stirred continuously at a stirring rate of 750 rpm. The first three reactor volumes of the resulting reaction product are discarded and the remainder of the product is collected and filtered. The filtered product is then dried at 120° C. in an oven overnight. Thereafter, the dried product is washed with deionized water and then redried at 120° C. in the oven for three hours.

A white, free-flowing powdery product is obtained having a substantially crystalline structure, a uniform particle size of approximately 0.2 micron and an exchange capacity of 1.0 meq/g. By x-ray diffraction analysis, the product shows the following peaks in the diffraction pattern:

| d Å |
| --- |
| 6.35 |
| 3.08 |
| 2.35 |
| 1.86 |
| 1.44 |

EXAMPLE 2

An acidic solution is made by diluting 25 liters of a 28 wt. % $AlCl_3$ solution to 60 liters total volume with water. In addition, a $TiCl_4$ solution is made by adding 3200 ml of $TiCl_4$ to 4000 ml of water to obtain a clear solution. The $TiCl_4$ solution is added to the previously prepared $AlCl_3$ solution to form an $AlCl_3$-$TiCl_4$ solution. A base solution is made by dissolving 9,000 g of NaOH in 60 liters of water. Then the following precipitation reaction is carried out:

The AlCl$_3$-TiCl$_4$ solution and the base solution are fed simultaneously into a 10 liter glass reactor with stirring. The AlCl$_3$-TiCl$_4$ solution is added at a rate of 100 ml/min and the base solution is added at a rate which maintained the pH at about 6.0. The temperature of the reaction is kept at 90° C. The first three reactor volumes are discarded and the remainder of the product is collected, filtered, and dried at 120° C. in an oven over-night. The dried product is then washed with water and redried at 120° C. for three hours.

A white, free-flowing powder is obtained, having a substantially crystalline structure, a uniform particle size of approximately 0.2 micron and an exchange capacity of 1.7 meq/g.

EXAMPLE 3

An acidic solution is made by diluting 25 liters of a 28 wt. % AlCl$_3$ solution to 60 liters total volume with water. In addition, a TiCl$_4$ solution is made by adding 400 ml of TiCl$_4$ to 2000 ml of water to obtain a clear solution. The TiCl$_4$ solution is added to the previously prepared AlCl$_3$ solution to form an AlCl$_3$-TiCl$_4$ solution. A base solution is made by dissolving 9000 g of NaOH in 60 liters of water. Then the following precipitation reaction is carried out:

The AlCl$_3$-TiCl$_4$ solution and the base solution are fed simultaneously into a 10 liter glass reactor with stirring. The AlCl$_3$-TiCl$_4$ solution is added at a rate of 100 ml/min and the base solution is added at a rate which maintained the pH at about 6.0. The temperature of the reaction is kept at 90° C. The first three reactor volumes are discarded and the remainder of the product is collected, filtered, and dried at 120° C. in an oven over-night. The product is then washed with water and redried at 120° C. for three hours.

A white, free-flowing powder is obtained, having a substantially crystalline structure, a uniform particle size of approximately 0.2 micron and an exchange capacity of 0.5 meq/g.

EXAMPLE 4

An acidic solution is made by diluting 25 liters of a 28 wt. % AlCl$_3$ solution to 60 liters total volume with water. In addition, a TiCl$_4$ solution is made by adding 1,600 ml of TiCl$_4$ to 2,000 ml of water to obtain a clear solution. The TiCl$_4$ solution is added to the previously prepared AlCl$_3$ solution to form an AlCl$_3$-TiCl$_4$ solution. A base solution is made by dissolving 9,000 g of NaOH in 60 liters of water. Then the following precipitation reaction is carried out:

The AlCl$_3$-TiCl$_4$ solution and the base solution are fed simultaneously into a 10 liter glass reactor with stirring. The AlCl$_3$-TiCl$_4$ solution is added at a rate of 100 ml/min and the base solution is added at a rate which maintained the pH at about 6.0. The temperature of the reaction is kept at 90° C. The first three reactor volumes are discarded and the remainder of the product is collected, filtered, and dried at 120° C. in an oven over-night. The product is then washed with water and redried at 120° C. for three hours.

A white, free-flowing powder is obtained, having a substantially crystalline structure, a uniform particle size of approximately 0.2 micron and an exchange capacity of 1.5 meq/g.

EXAMPLE 5

A 100 g portion of the product of Example 4 is suspended in 200 ml of water with stirring. A 100 meq sample of KI dissolved in 100 ml of water is then added to the suspension. The solid mixture is filtered, washed, dried at 120° C. in an oven and then analyzed for $I^{-1}$.

EXAMPLE 6

A piece of 2×2 inch (5×5 cm) white cotton cloth is put into a glass vessel along with 5 g of an anion exchange hydrous oxide of the formulation of Example 1 and 1.0 gram TIDE* brand laundry detergent in 1,000 ml of water. (*TIDE is a trademark of Procter & Gamble Co.) The mixture is stirred rapidly and a 100 ml solution of a commercial yellow cloth dye is added rapidly. After two minutes the cloth sample is removed, rinsed and dried. The entire procedure is repeated without the anion exchange additive. The cloth square with no additive shows significant dye coloration which can not be removed by rinsing. The cloth square which was in the anion exchange additive shows no significant dye coloration and is slightly off-white in color.

What is claimed is:

1. An anion exchanger material comprising a substantially crystalline material exhibiting anion exchange properties represented by the formula $$[M^a{}_{1-x}Q_x{}^{a+1}(OH)_z](A^{-1})_d$$
$$(A^{-2})_e(A^{-3})_f(A^{-4})_g \cdot nH_2O$$

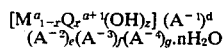

where M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f and g are real numbers greater than or equal to zero and satisfy the following:

$2y + z = a; \; y < z$ $0 < d + 2e + 3f + 4g \leq x$ $0 \leq n \leq 10$ provided that when y=0, a is not equal to 2.

2. The anion exchanger of claim 1 wherein x is from about 0.01 to about 0.4.

3. The anion exchanger of claim 2 wherein x is from about 0.1 to about 0.3.

4. The anion exchanger of claim 1 wherein y/z is less than 1.

5. The anion exchanger of claim 4 wherein y is 0 and z is 1.

6. The anion exchanger of claim 1 wherein M is aluminum.

7. The anion exchanger of claim 1 wherein Q is titanium.

8. The anion exchanger of claim 1 wherein $A^{-1}$, is one or more anions selected from the group consisting of halides, nitrates, phosphates, hydrogen carbonates, hydrogen sulfates, and mixtures thereof; $A^{-2}$ is one or more anions selected from the group consisting of phosphates, carbonates, sulfates, and mixtures thereof; $A^{-3}$ is one or more anions consisting of phosphates; and $A^{-4}$ is one or more anions selected from the group consisting of ethylenediaminetetra-acetic acid, diphosphates, and mixtures thereof.

9. The anion exchanger of claim 1 wherein $A^{-1}$ is selected from the group consisting of $Cl^{-1}$, $Br^{-1}$, $F^{-1}$, $I^{-1}$, $H_2PO_4^{-1}$ and mixtures thereof and e, f, and g are 0.

10. The anion exchanger of claim 1 wherein $A^{-2}$ is selected from the group consisting of $SO_4^{-2}$, $CO_3^{-2}$, $HPO_4^{-2}$ and mixtures thereof and d, f, and g are 0.

11. The anion exchanger of claim 1 wherein $A^{-1}$ is $Cl^{-1}$, $A^{-2}$ is $SO_4^{-2}$ and f and g are 0.

12. The anion exchanger of claim 1 represented by the formula:

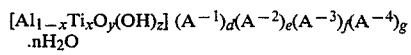
$$[Al_{1-x}Ti_xO_y(OH)_z](A^{-1})_d(A^{-2})_e(A^{-3})_f(A^{-4})_g \cdot nH_2O$$

where $A^{-1}$, $A^{-2}$, $A^{-3}$, and $A^{-4}$ are each one or more exchangeable anions each having a negative valence of 1, 2, 3, and 4, respectively; x is $0 < x \leq 0.5$; and n, y, z, d, e, f, and g are real numbers greater than or equal to zero and satisfy the following:

$$2y + z = a; \quad y < z$$

$$0 < d + 2e + 3f + 4g < x$$

$$0 \leq n \leq 10$$

13. The anion exchanger of claim 12 represented by the formula $[Al_{1-x}Ti_xO_y(OH)_z](Cl^{-1})_d \cdot nH_2O$.

14. The anion exchanger of claim 12 represented by the formula $[Al_{1-x}Ti_xO_y(OH)_z](Cl^{-1})_d(SO_4^{-2})_e \cdot nH_2O$.

15. A process for preparing the anion exchanger of claim 1 which comprises coprecipitating in an aqueous medium at constant acidic pH inorganic mixed metal hydroxides or hydrated mixed metal oxides of metal elements, said mixed metal hydroxide or hydrated oxide having a substantially crystalline structure as shown by x-ray diffraction patterns and exhibiting anion exchange properties at temperatures up to about 150° C.

16. The method of claim 15 wherein the coprecipitating is carried out by a continuous process.

17. The method of claim 16 wherein the coprecipitating is carried out by substantially simultaneously contacting a reaction solution of a pair of metal elements and a base.

18. The method of claim 15 wherein the aqueous medium is at a pH lying in the range of about 3 to about 7.5.

19. The method of claim 18 wherein the aqueous medium is at a pH lying in the range of about 4 to about 6.

20. The method of claim 15 wherein the coprecipitating is carried out at a temperature of from about 50° C. to about 150° C.

21. The method of claim 20 wherein the coprecipitating is carried out at a temperature of from about 70° C. to about 90° C.

22. The method of claim 15 wherein the metal elements are aluminum and titanium.

23. The method of claim 15 including further drying the mixed metal hydroxide or hydrated oxide at a temperature of below about 150° C.

24. The method of claim 23 wherein the drying temperature is from about 50° C. to below about 150° C.

25. The method of claim 24 wherein the drying temperature is from about 100° C. to below about 150° C.

26. The method of claim 23 including further washing the dried mixed metal hydroxide or hydrated oxide with water.

27. The anion exchanger of claim 12 which is: $[Al_{0.9}Ti_{0.1}O_y(OH)_z]Cl_{0.1} \cdot nH_2O$, $[Al_{0.6}Ti_{0.4}O_y(OH)_z]Cl_{0.4} \cdot nH_2O$, $[Al_{0.95}Ti_{0.05}O_y(OH)_z]Cl_{0.05} \cdot nH_2O$, $[Al_{0.8}Ti_{0.2}O_y(OH)_z]Cl_{0.2} \cdot nH_2O$, or $[Al_{0.8}Ti_{0.2}O_y(OH)_z]Cl_{0.18}I_{0.02} \cdot nH_2O$.

28. The composition comprising a detergent and an anion exchanger material of claim 10.

29. The composition of claim 28 wherein said anion exchanger is prepared according to claim 12.

* * * * *